United States Patent [19]

Cloetens et al.

[11] Patent Number: 5,140,574
[45] Date of Patent: Aug. 18, 1992

[54] READ AND/OR WRITE DEVICE

[75] Inventors: Henri Cloetens; Robertus W. C. Groen; Antonius H. M. Akkermans, all of Eindhoven, Netherlands

[73] Assignee: U.S. Philips Corporation, New York, N.Y.

[21] Appl. No.: 595,056

[22] Filed: Oct. 10, 1990

[30] Foreign Application Priority Data

Jan. 19, 1990 [NL] Netherlands ............... 9000131

[51] Int. Cl.5 .................................. G11B 7/00
[52] U.S. Cl. ......................... 369/44.28; 369/32; 360/78.04
[58] Field of Search ......... 369/44.11, 44.12, 44.13, 369/44.14, 44.25, 44.27, 44.28, 44.29, 44.31, 44.32, 44.33, 32; 360/78.04–78.14

[56] References Cited

U.S. PATENT DOCUMENTS

| | | | |
|---|---|---|---|
| 4,794,579 | 12/1988 | Baas | 369/44.11 |
| 4,855,977 | 8/1989 | Getreuer et al. | 369/44.28 |
| 4,866,687 | 9/1989 | Kasai et al. | 369/44.11 |
| 4,868,819 | 9/1989 | Kimura | 369/44.11 |
| 4,887,253 | 12/1989 | Tateishi | 369/44.28 |

Primary Examiner—Roy N. Envall, Jr.
Assistant Examiner—Thai Tran
Attorney, Agent, or Firm—Leroy Eason

[57] ABSTRACT

A read and/or write device for a record carrier having tracks which extend substantially parallel to each other. A read and/or write head for scanning the tracks is moved by a positioning system in a direction transverse to the tracks. During such movement a counter derives the number of tracks traversed per unit time from the number of reference level crossings of a periodic signal $V_{sp}$ having a frequency corresponding to the track crossing frequency. Counting of spurious level crossings is inhibited by blocking the counter during a blocking interval (tbl) following each level crossing which is counted. The speed of the read and/or write head is controlled on the basis of the counted level crossings.

10 Claims, 4 Drawing Sheets

READ AND/OR WRITE DEVICE

BACKGROUND OF THE INVENTION

The present invention relates to a read and/or write device for reading and/or recording information from-/in tracks which extend substantially parallel to each other on a record carrier which device comprises a read and/or write head for scanning the record carrier for the purpose of reading and/or recording, a positioning system for moving the read and/or write head in a direction transverse to the tracks, detection means for deriving a periodic signal from the record carrier area being scanned during a movement in said direction, which periodic signal has a frequency which is indicative of the number of tracks traversed per unit of time, and a counting circuit for determining the number of tracks traversed by counting the number of reference level crossings of the periodic signal.

A device of this type is disclosed in U.S. Pat. No. 4,106,058. for reading disc-shaped optically readable record carriers. During movement of an optical read head of this device, a periodic signal is generated which crosses a zero reference level when a track is passed and so has a frequency equal to the number of tracks passed per unit of time. This signal is the envelope of the high-frequency read signal. The number of tracks passed is determined by counting the number of zero crossings of this envelope of the high-frequency signal.

A problem occurring in the prior-art device is that the counted number of tracks passed is not always in conformity with the number of tracks actually passed, so that this information can be used only to a limited extent for controlling the radial movement of the optical read head, for example for controlling the movement performed to locate a desired track portion.

SUMMARY OF THE INVENTION

It is an object of the invention to provide a device of the type described in the opening paragraph wherein the number of tracks passed is determined more accurately.

According to the invention this object is achieved in a device including a technique for to prevent level crossings from being counted during a specific blocking interval which directly follows the instant at which a level, crossing has been counted.

A preferred illustrative embodiment of the device adapts the length of the blocking interval in dependence upon a signal which is indicative of the length of the time interval between two level crossings counted.

This illustrative embodiment has the advantage that the length of the blocking interval is adapted automatically to the speed with which the tracks are passed, being shortened as the speed is increased and lengthened as the speed is decreased so that the length of the blocking interval is always optimal. Preferably, the maximum length of the blocking interval is limited. This served to prevent the blocking interval in the case of low speeds of the read and/or write head from becoming so long that when the read and/or write head is subsequently accelerated the speed of the read/write head can be become so high that one or more tracks are passed before the blocking interval has elapsed. Determining the number of tracks passed and inhibiting counting of the zero crossings during the blocking intervals achieves a very accurate count of the number of tracks passed, so that the counting results are very suitable for deriving a speed measurement signal on the basis of which the speed of the write and/or read head can be controlled.

An illustrative embodiment of the device comprises a control system for controlling the speed of the positioning system, which control system comprises means for deriving from the number of tracks traversed as counted by the counting circuit a speed measurement signal which is indicative of the counted numbers of level crossings in successive measurement intervals of constant length, and control means for controlling the positioning system in dependence upon the speed measurement signal.

A further embodiment is characterized in that the control system comprises a low-pass filter for rejecting high-frequency signal components of the speed measurement signal. However, as a result of the fairly coarse quantization of the measurement signal such an embodiment may still exhibit substantial inaccuracies. Since the frequency spectrum of these inaccuracies contains predominantly high-frequency components situated outside the control frequency band, these inaccuracies do not pose a problem. However, in order to prevent excessive signal power which does not contribute to the control performance from being applied to the control circuit for controlling the positioning system, which may give rise to undesirable noise production, it is preferred to remove the high-frequency components from the measurement signal by means of a low-pass filter. The frequency spectrum of the inaccuracies caused by the quantization is a first-order spectrum, which means that the spurious components resulting from quantization increase by 6 dB per octave at increasing frequency. In order to minimize the influence of these signal components on the control circuit it is therefore preferred to choose a low-pass filter of at least the second order, which means that the transfer characteristic of the filter exhibits a roll-off of at least 12 dB per octave at higher frequencies.

In spite of the fact that counting is inhibited during the blocking interval, it may occur occasionally that as result of defects of the record carrier the count of the level crossings is too high in comparison with the number of tracks actually passed. This means that the speed indicated by the speed measurement signal is higher than the actual speed. In order to prevent the speed control from being disturbed to an undesirable extent in the case of a large discrepancy between the measured speed and the actual speed the speed signal represented by the measurement signal is preferably limited at a specific maximum value.

BRIEF DESCRIPTION OF THE DRAWING

Further illustrative embodiments and the advantages thereof will now be described in more detail, by way of example, with reference to FIGS. 1 to 11, of which

DETAILED DESCRIPTION OF THE PREFERRED EMBODIMENT

Figure 1:
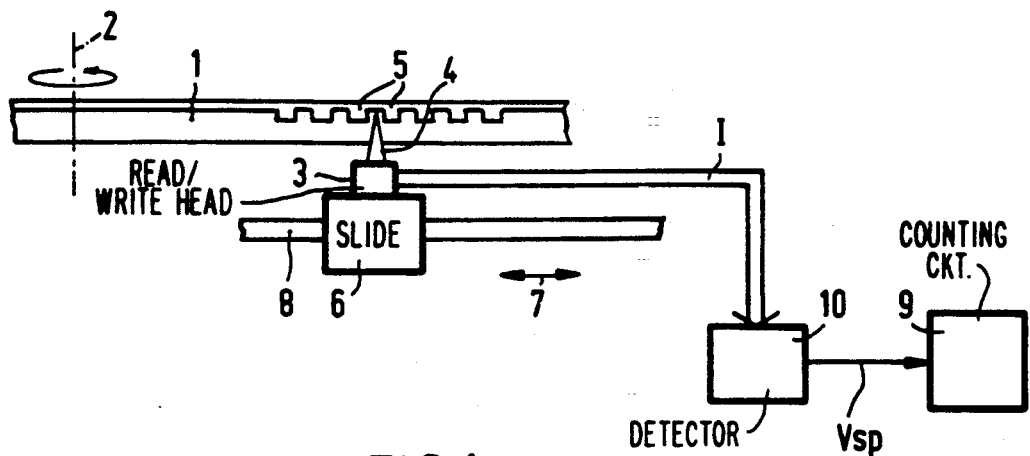
FIG. 1 shows diagrammatically an embodiment of a recording and/or read device.

FIG. 1 shows a disc-shaped optical record carrier 1 which is rotated about an axis 2. The record carrier 1 has mutually parallel concentric tracks. In the tracks information has been or can be recorded. An optical read and/or write head 3 of a customary type is arranged opposite the rotating record carrier 1 to scan the record carrier 1 by means of a radiation beam 4. The read and/or write head 3 is coupled to a read and/or write circuit (not shown) of a customary type. The read and/or write head 3 can be moved in a radial direction relative to the record carrier by means of a positioning system of a customary type. Such a positioning system may comprise, for example, a slide 6 carrying the read and/or write head 3 and movable along a guideway 8 in the directions indicated by an arrow 7 by means of a linear motor secured to the slide. The read and/or write head 3 comprises a radiation-sensitive detection system comprising a plurality of subdetectors for detecting the radiation reflected from the record carrier 1. The subdetectors supply signal currents I which are substantially proportional to the amounts of detected radiation. Two logic signals, TL and RP, are derived from the signal currents I by means of a customary detection circuit 10. The logic value of the signal TL indicates whether the beam 4 is aimed mainly on one of the tracks 5 or mainly on one of the lands between two tracks 5. Such a signal is referred to as a track-loss signal. The logic value of signal, RP indicates the polarity of the deviation between the center of the scanning position on the track and the center of the nearest track 5. When the optical read and/or write head 3 is moved the logic values of the signals RP and TL change at each track crossing and so vary periodically at a frequency equal to the number of tracks passed by the read and/or write head 3 per unit of time. One of the signals is applied to a counting circuit 9 for determining the number of tracks 5 passed by the read and/or write head 3. This signal will be referred to hereinafter as the track-passage signal Vsp.

Figure 2:
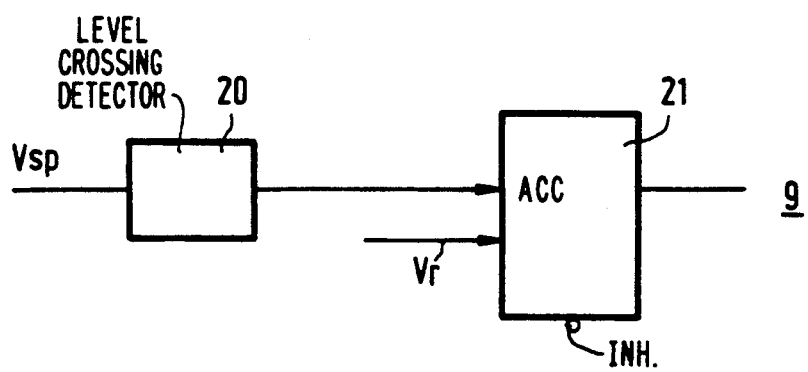
FIG. 2 shows a counting circuit for use in the device shown in FIG. 1, FIGS. 3 and 5 show examples of a level-crossing detector for use in an embodiment of the invention.

FIG. 2 shows in detail an example of the counting circuit 9, which comprises a level-crossing detector 20 which detects a change of the logic value of the signal Vsp and which is responsive to such a detection to supply a counting pulse to a clock input ACC of an UP/DOWN counter 21. The UP/DOWN counter 21 receives a direction signal Vr indicating the direction in which the read and/or write head is moved. Such a direction signal can be derived, for example, from a control circuit for controlling the radial movement of the read and/or write head 3. The counter 21 is of a type which in response to a counting pulse on its clock input increments or decrements its count by one depending on the received direction signal. Since the frequency of the signal Vsp is equal to the number of tracks passed per unit of time the count is always representative of such number of tracks passed.

Figure 3:
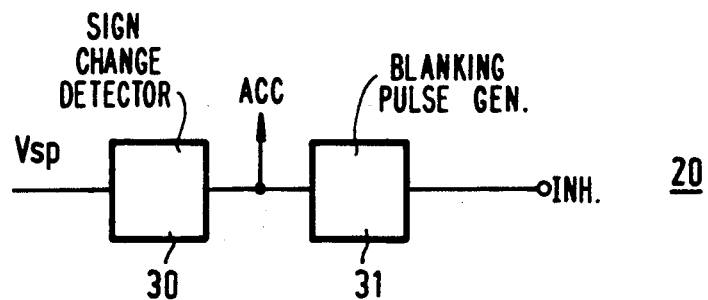
Figure 4:
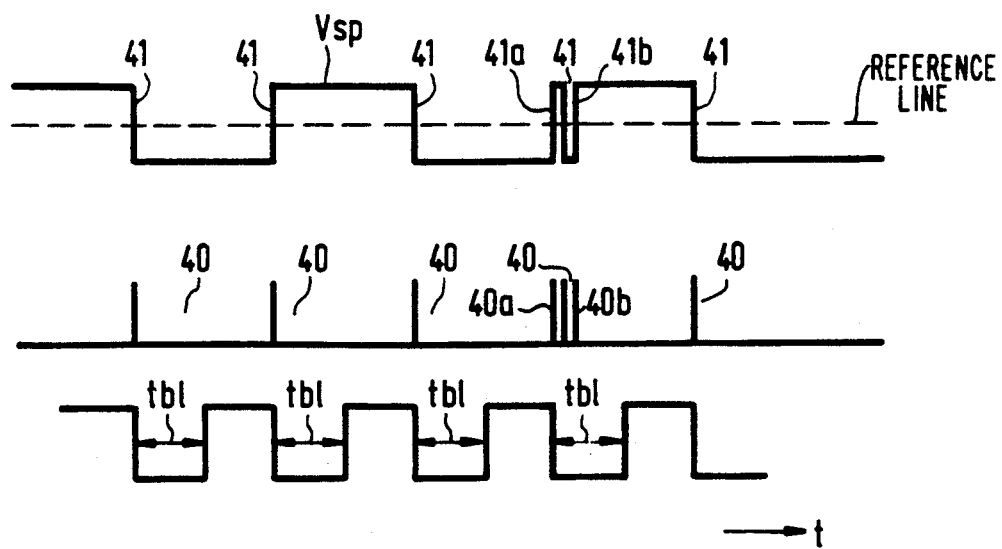
FIG. 4 shows a number of signals appearing in the level-crossing detectors of FIGS. 3 and 5 as a function of time t.

FIG. 3 shows an example of the level-detection circuit 20, which comprises a change-of-sign detector 30, to which the signal Vsp is applied. The change-of-sign detector 30 is responsive to every reference-level crossing of the signal Vsp to supply a counting pulse 40. FIG. 4 shows the signal Vsp and the counting pulses 40 supplied by the change-of-sign detector 30 as a function of time t. The signal Vsp shown in FIG. 4 exhibits a number of parasitic reference-level crossings resulting, for example, from record-carrier defects, noise etc. The parasitic reference-level crossings bearing the reference numerals 41a and 41b result in pulses 40a and 40b being generated by the change-of-sign detector 30. If the pulses 40a and 40b are counted by the counting circuit, the count of the counter 21 will no longer be representative of the correct number of tracks passed. In accordance with the invention such undesired counting of parasitic reference-level crossings can be precluded in that upon each incrementing of the count further incrementing thereof is inhibited during a blocking interval tbl. In the example of the level-crossing detector 20 shown in FIG. 3, this is achieved by means of a pulse generator 31 which supplies a blocking pulse Vbl in response to a counting pulse 40, such blocking pulse having a time interval tbl. The output of the change-of-sign detector 30 is coupled to the clock input ACC of the counter 21 and the output of the pulse generator 31 may be connected to a count-inhibit input INH of the counter 21 to disable the counter 21 during the blocking pulse.

The speed with which the read and/or write head 3 is moved may vary considerably. To optimize the blocking time interval tbl, it is therefore desirable to adapt the length of the blocking interval to the speed with which the read and/or write head 3 is moved.

Figure 5:
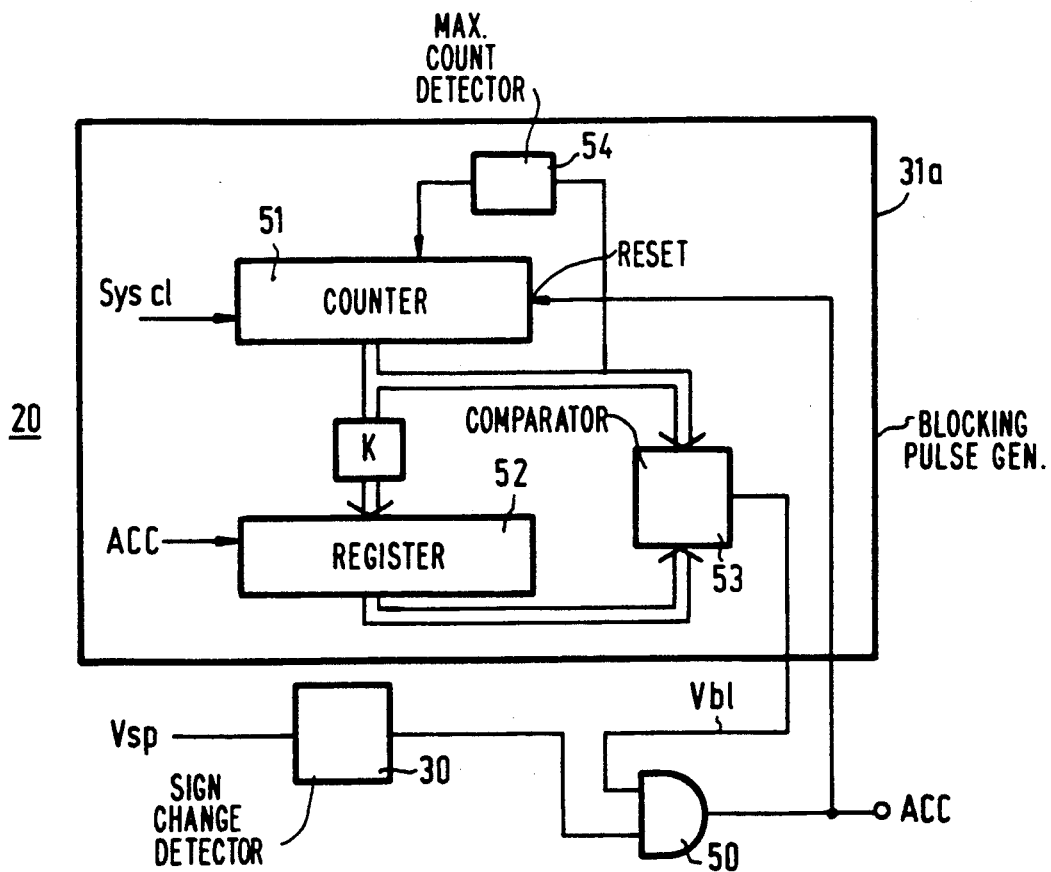

FIG. 5 shows an example of the level-crossing detector 20 which adapts the blocking interval tbl to the speed of movement. The level-crossing detector 20 shown comprises an AND gate 50 having an input coupled to the output of the change-of-sign detector 30 and having another input for receiving the blocking pulse Vbl coupled to an output of a pulse generator 31a. The output of the AND gate 50 is coupled to the clock input of the counter 21. The AND gate 50 blocks the supply of pulses 40 from the output of the change-of-sign detector 30 to the clock input of the counter 21 during the blocking interval tbl. In order to determine the length of the blocking interval tbl, the pulse generator 31a comprises a counter 51 for determining the length of the time interval between successive counting pulses transferred to the output of the AND gate 50. For this purpose a high-frequency clock signal of constant frequency is applied to a clock input of the counter 51 and the output signal of the AND gate 50 is applied to a reset input of the counter 51. In response to a pulse on the output of the AND gate 50, a number which is a fraction K (K being for example ½) of the count in counter 51 is loaded into a register 52. For this purpose the register 52 has been with a counting load input coupled to the output of further counting the AND gate 50. A comparator 53 compares the count on me output of the counter 51 with the contents of the register 52.

The comparator 53 produces a blocking pulse on its output as long as the count of the counter 51 is smaller than the contents of the register 52. After the counter 21 has been supplied with a counting pulse 40, the transfer of further counting pulses 40, counter 21 is thus inhibited for a blocking interval tbl whose length is a constant fraction K of the time interval between the last and the penultimate counting pulses pulse 40 which were transferred by the AND gate 50 to counter 21.

It is to be noted that the circuit for adapting the length of the blocking time interval is not limited to the example shown herein. For example, if a speed signal is available which is indicative of the speed of the read and/or write head 3, it is also possible to adapt the length of the blocking time interval in dependence upon this speed signal. This is because such a speed signal is also a measure of the time interval between consecutive pulses 40. It is also possible to adapt the length of the blocking interval tbl in dependence upon an average of a number of previously determined time intervals between successively transferred pulses 40 instead of being dependent upon the time interval between the last and the penultimate pulse transferred.

During a displacement of the read and/or write head 3 the speed may become very low, as a result of which the blocking interval may become so long that some tracks have been traversed already when the read and-/or write head 3 is accelerated. In order to preclude this, it is preferred to limit the length of the blocking interval tbl. In the example of the level-crossing detector shown in FIG. 5 this can be achieved, for example, by means of a detection circuit 54 to which the count of the counter 51 is transferred and which applies a control signal to the counter 51 when a specific maximum count is reached, to disable the counter 51.

Figure 6:
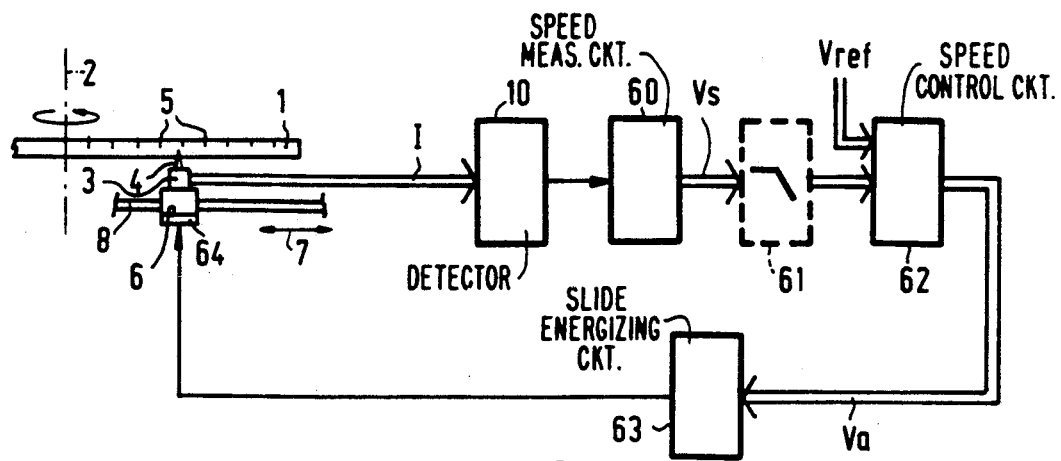
FIG. 6 shows an embodiment of a recording and/or read device in accordance with the invention, comprising a speed-control system.

The foregoing method can be employed for controlling the speed of the movement. An example of a very suitable speed control method will now be described with reference to FIGS. 6 to 11, of which FIG. 6 is a block diagram of the control system. In this Figure elements corresponding to those already described bear the same reference numerals. In the device shown in FIG. 6 the track-passage signal Vsp is applied to a speed measurement circuit 60 for deriving a digital speed measurement signal Vs which indicates the value of the speed of the read and/or write head 3 at equidistant instants. The speed measurement signal Vs is applied to a control circuit 62, if desired via a digital low-pass filter 61. The control circuit 62 may be of a customary type, which compares the speed value of in the received speed measurement signal Vs with a reference value Vref and derives a digital control signal Va depending upon the difference between the speed value and the reference value. The digital control signal Va is applied to an energizing circuit 63 of a customary type, which energizes a drive motor 64 for moving the slide 6 in accordance with the received control signal Va so as to maintain a difference of substantially zero between the speed value and the reference value.

Figure 7:
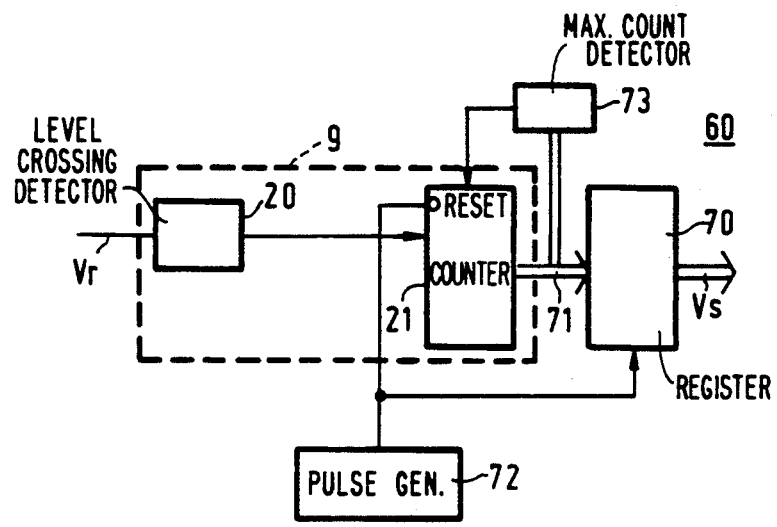
FIG. 7 shows an example of a speed measurement circuit for use in the device shown in FIG. 6.

FIG. 7 shows an example of the speed measurement circuit 60. The circuit comprises the counting circuit 9 comprising the elements 20 and 21. The measurement circuit 60 further comprises a parallel-in parallel-out register 70, to which the count of the counter 21 is applied via a bus 71. A pulse generator 72 supplies pulses of a constant frequency, which is low relative to the average frequency with which the pulses 40 are generated during the movement of the read and/or write head 3. The pulses supplied by the pulse generator 72 are applied to a reset input of the counter 21 and to a load input of the register 70. Thus, the counter 21 is reset to zero in response to every pulse from the pulse generator 72, so that the counter 21 always counts the number of pulses 40 supplied by the level-crossing detector 20 between two consecutive pulses from the pulse generator 72. Since the frequency of the signal Vsp, and hence the frequency of the pulses 40, is proportional to the speed of the read and/or write head 3 relative to the tracks, the count f the counter 21 is indicative of this speed of the read and/or write head 3 just before the instant at which the counter 21 is reset to zero. This count is each time loaded into the register 70 so that the contents of the register 70 always represents the speed of the read and/or write head 3. The register 70 supplies a signal corresponding to the contents as the speed measurement signal Vs. In the present example the frequency of the signal supplied by the pulse generator 72 is low relative to the frequency of the pulses 40. However, it is to be noted that if the speed measurement signal is filtered by a low-pass filter the frequency of the signal from the pulse generator may be higher than the frequency of the pulses 40.

Figure 8:
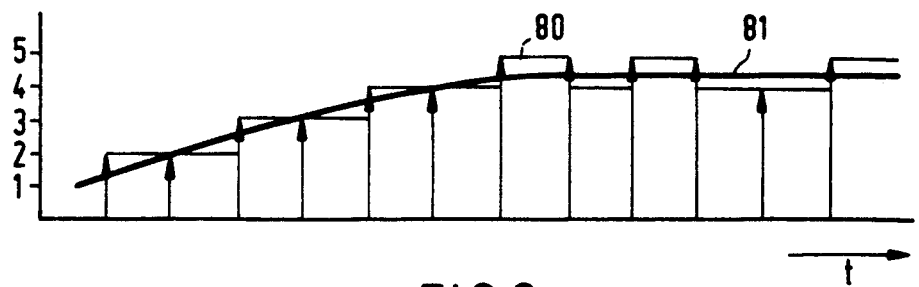
FIG. 8 represents the speed measured by the speed-measurement circuit shown in FIG. 7 and the actual speed as a function of time.
Figure 9:
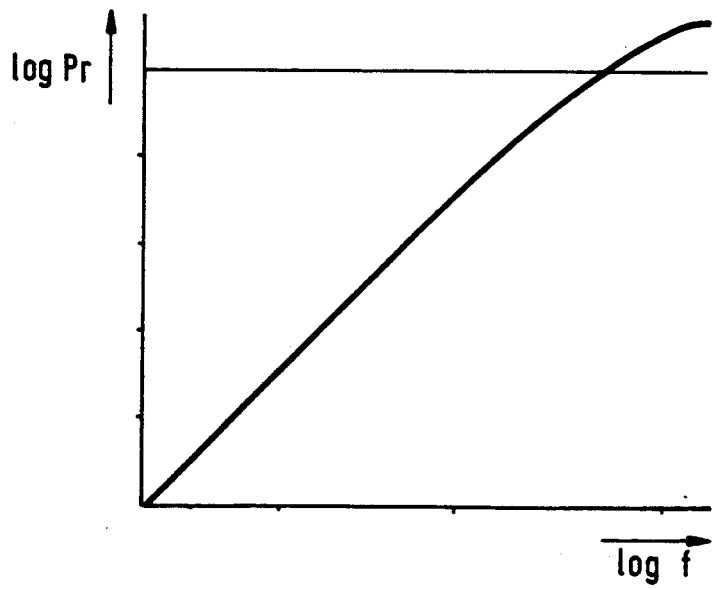
FIG. 9 shows the power distribution of the quantization noise in the measured speed.
Figure 10:
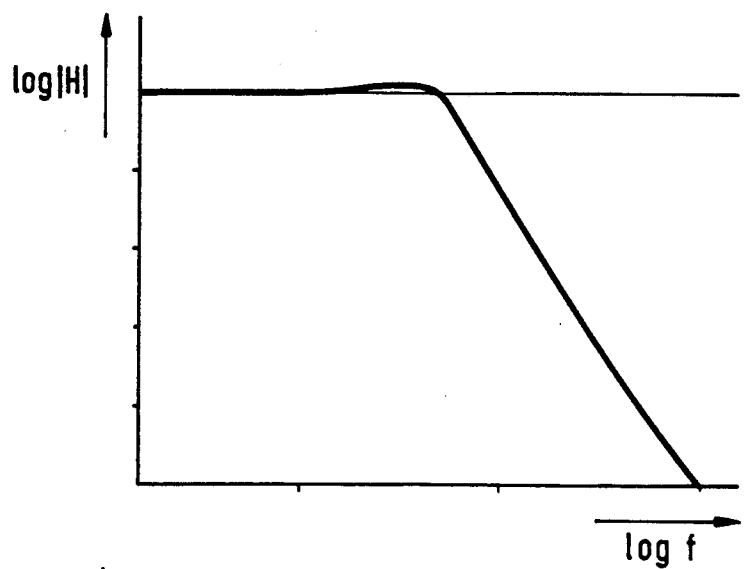
FIG. 10 shows a transfer characteristic of a low-pass filter for use in the device shown in FIG. 6.
Figure 11:
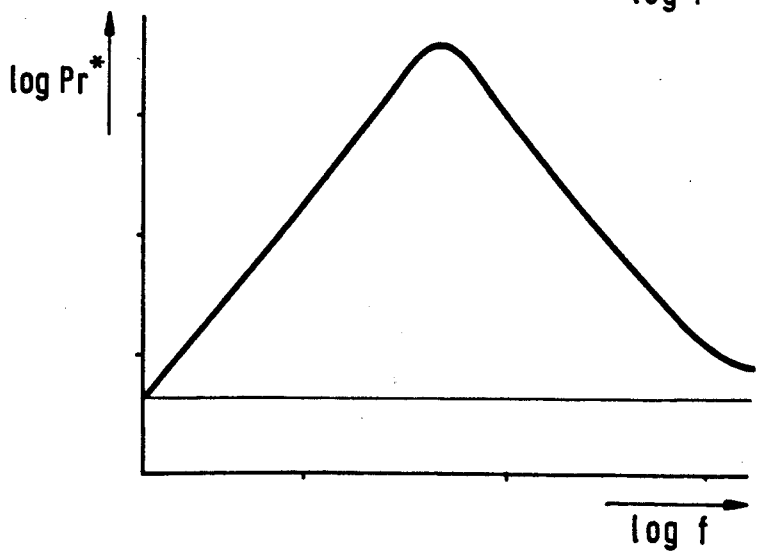
FIG. 11 shows the power distribution of the quantization noise after filtering by means of a low-pass filter having the transfer characteristic shown in FIG. 10.

In FIG. 8, the reference numeral 80 indicates the speed variation as represented by the measurement signal Vs. The reference numeral 81 indicates the actual variation of the speed of the read and/or write head 3. As is apparent from FIG. 8, the signal Vs exhibits an inaccuracy resulting from a quantization which is inevitable when the speed is determined in this manner. The signal power Pr of this inaccuracy, hereinafter briefly referred to as quantization noise, is plotted as a function of the frequency in FIG. 9. The quantization noise exhibits a first-order power spectrum, i.e. the noise amplitude increases with 6 dB per octave as function of the frequency. In the case of a power distribution of this type the signal power situated within the bandwidth of the speed control system is only a small fraction of the overall noise power. Therefore, the quantization noise has a minimal effect on the performance of the speed control system. However, a disadvantage may be that the control circuit 62 and/or the energizing circuit 63 is/are saturated as result of this quantization noise. Moreover, the quantization noise leads to unnecessary dissipation in the drive motor 64. The quantization noise may also give rise to undesirable amount of noise being produced by the positioning system. The above drawbacks can be mitigated largely by suppressing the high-frequency components in the quantization noise by means of the low-pass filter 61. Preferably, a second or higher order low-pass filter is used, i.e. a filter in which the transfer characteristic exhibits a roll-off of at least 12 dB per octave for the higher frequencies. In that case the quantization noise power for the higher frequencies is reduced to substantially zero after filtering. By way of illustration FIG. 10 shows the transfer characteristic H of a suitable second order low-pass filter. FIG. 11 shows the signal power spectrum of the quantization noise Pr* after filtering by means of this filter. The use of a counting circuit in which counting is inhibited during a blocking time interval tbl after a change of the count significantly reduces the likelihood that the measured speed and the actual speed deviate from each other as a result of parasitic level crossings of the signal Vsp. A circuit which prevents parasitic level crossings from being counted is therefore very suitable for use in such a speed control. However, it is to be noted that, in principle, the speed control may also be used in speed control systems in which counting is not inhibited during a blocking interval.

Although the invention significantly reduces the counted number of parasitic level crossings it may occur occasionally that the measured speed is substantially higher than the actual speed as a result of defects on the record carrier, which may disturb the speed control considerably. Such a considerable disturbance can be avoided by limiting the speed values of the measurement signal Vs. In the example shown in FIG. 7 this can be achieved, for example, by means of a detection circuit 73 to which the count of the counter 21 is applied and which disables the counter 21 by means of a control signal applied to the counter 21 when a specific maximum count is reached. However, it is also possible to use other circuits for limiting the speed values.

In the speed control described above, where a measurement signal is derived in the form of a series of signal values which are indicative of the number of tracks traversed in successive measurement intervals, it is important that the length of the measurement intervals is constant. Indeed, in sampling control systems such as the described speed control system the transfer characteristic is a function of the length of the time intervals between the consecutive instants of the sampled measurement values. Moreover, it is to be noted that the described speed control system is highly immune to possible inaccuracies (jitter) in the determination of the exact instant of the crossing of a track. This is because such a jitter gives rise to an additional high-frequency noise component, which has only a minor influence on the performance of the speed control. This immunity to jitter makes the speed measurement method very suitable for speed control.

In the foregoing described illustrative embodiment the number of tracks traversed is derived from a binary signal.

However, it is to be noted that it is not necessary that the signal Vsp is a binary signal. The number of tracks traversed can also be determined on the basis of analog signals, such as a tracking signal which indicates the magnitude of the deviation between the record carrier area being scanned and the nearest track, or an analog signal which is representative of the envelope of an information signal being read. Although the invention has been described for an optical recording and read device, the invention is not limited to optical recording and read devices but may be applied, in principle, to any recording and/or read device in which during a displacement of the recording and/or read head a periodic signal is derived from the record carrier area being scanned, which signal has a frequency proportional to the number of tracks traversed per unit of time.

We claim:

1. A read and/or write device for reading and/or recording information in tracks which extend substantially parallel to each other on a record carrier, the device comprising:
   a read and/or write head for scanning the record carrier for the purpose of reading and/or recording;
   a positioning system for moving the read and/or write head in a direction transverse to the tracks;
   detection means for deriving a periodic signal from the record carrier area being scanned during a movement in said direction, the periodic signal having a frequency which is indicative of the number of tracks traversed per unit of time;
   means for producing a count pulse in response to each crossing of a reference level by said periodic signal;
   a counting circuit for determining the number of tracks traversed by counting said count pulses; and
   blocking means for preventing said counting unit from counting during blocking intervals which respectively directly follow the instants at which each successive count is produced by said counting unit.

2. A device as claimed in claim 1, wherein the device further comprises means for adapting the length of each blocking interval in dependence upon a signal which is indicative of the time interval between two successive count pulses.

3. A device as claimed in claim 2, wherein the blocking means comprise means for limiting the duration of each blocking interval to a specific maximum value.

4. A device as claimed in claim 1, wherein the device further comprises a control system for controlling the speed of the positioning system, which control system comprises means for deriving from the number of tracks traversed as counted by the counting circuit a speed measurement signal which is indicative of the number of tracks traversed during each of successive measurement intervals of constant length, and control means for controlling the positioning system in dependence upon the speed measurement signal.

5. A device as claimed in claim 4, wherein the control system comprises a low-pass filter for rejecting high-frequency signal components of the speed measurement signal.

6. A device as claimed in claim 5, wherein the filter is at least of the second order.

7. A device as claimed in claim 4, wherein the device further comprises means for limiting the speed measurement signal to a specific maximum value.

8. A device as claimed in claim 2, wherein the device further comprises a control system for controlling the speed of the positioning system, which control system comprises means for deriving from the number of tracks traversed as counted by the counting circuit a speed measurement signal which is indicative of the number of tracks traversed during each of successive measurement intervals of constant length, and control means for controlling the positioning system in dependence upon the speed measurement signal.

9. A device as claimed in claim 3, wherein the device further comprises a control system for controlling the speed of the positioning system, which control system comprises means for deriving from the number of tracks traversed as counted by the counting circuit a speed measurement signal which is indicative of the number of tracks traversed during each of successive measurement intervals of constant length, and control means for controlling the positioning system in dependence upon the speed measurement signal.

10. A device as claimed in claim 2, wherein the length of each blocking interval is less than the interval between successive preceding count pulses.

* * * * *